United States Patent [19]

Pohl et al.

[11] Patent Number: 4,860,146
[45] Date of Patent: Aug. 22, 1989

[54] DIFFERENTIAL CURRENT PROTECTION CIRCUIT BREAKER

[75] Inventors: Fritz Pohl, Hemhofen; Dieter Harr, Regensburg, both of Fed. Rep. of Germany

[73] Assignee: Siemens Aktiengesellschaft, Berlin and Munich, Fed. Rep. of Germany

[21] Appl. No.: 136,830

[22] Filed: Dec. 22, 1987

[30] Foreign Application Priority Data

Dec. 22, 1986 [DE] Fed. Rep. of Germany ....... 3643981

[51] Int. Cl.<sup>4</sup> .............................................. H02H 3/26
[52] U.S. Cl. ....................................... 361/42; 361/45; 361/54; 361/110
[58] Field of Search .................................. 361/54–57, 361/58, 88, 89, 91, 111, 110, 42, 44

[56] References Cited

FOREIGN PATENT DOCUMENTS 0167079 6/1985 European Pat. Off. .
3429381 2/1986 Fed. Rep. of Germany .
2538179 12/1982 France .

Primary Examiner—Todd E. DeBoer
Attorney, Agent, or Firm—Kenyon & Kenyon

[57] ABSTRACT

A differential current protection circuit breaker that operates as a magnetic amplifier has a secondary winding connected in series to a complex, predominately capacitive measuring impedance and a square wave generator. An evaluating circuit is connected at a tap and is actuated along a tripping device and a switch latch of a switching contact device. The evaluation circuit is blocked by a sensor that responds to extraneous current surges or voltage surges during a predetermined response time. A blocking device in the tripping device responds to the signals from the sensor.

6 Claims, 3 Drawing Sheets

TO THE
TRIPPING
DEVICE

DIFFERENTIAL CURRENT PROTECTION CIRCUIT BREAKER

BACKGROUND OF THE INVENTION

1. Field of the Invention

The present invention relates to a differential current protection circuit breaker that uses a magnetic amplifier circuit.

2. Description of Related Art

A known differential current protection circuit breaker has a secondary winding that connects a complex, predominantly capacitive measuring impedance in series with a square wave generator. A tap is connected to an evaluation circuit which actuates a switch contact device via a tripping device that acts as a latch. A differential current protective circuit breaker of this type is disclosed in West German Patent No. 3,424,959.

A differential current protection circuit breaker magnetically saturates a secondary winding of a magnetic amplifier (transductor) circuit of a summing current transformer with a.c. current using a high-frequency a-c voltage. A magnetic field is superimposed in the summing current transformer if a differential current flows through the primary winding. This magnetic field has the same direction as the applied field and exceeds the saturation limit of the transformer so that the inductive impedance of the secondary winding decreases. A measuring impedance that is in series with the secondary winding measures a higher potential relative to the reference potential from the square wave generator. The voltage amplitude at the measuring distance also increases. An evaluation circuit can compare the voltage amplitude with a predetermined threshold voltage. A tripping device can be activated and the monitored lines interrupted if the threshold voltage is exceeded. In addition to a-c currents, this type of differential current protection circuit breaker responds to all fault currents, such as to fault currents with a d-c component and to a smooth d-c fault current. This type of a differential current protection circuit breaker is effectively sensitive to all kinds of currents.

The summing current transformer requires few primary windings because of the complex, predominantly capacitive measuring impedance of the frequency of the squarewave generator. The small number of windings means that the heat of the summing current transformer is easily removed even in a small amount of space. A small protection circuit breaker can therefore be constructed as shown in West German Patent No. 3,424,959.

This type of sensitive differential current protection circuit breaker has a tendency to erroneously trip in response to current or voltage surges. West German Patent 3,429,381 provides for voltage limitation and subsequent integration to increase the resistance to current surges. A Zener diode contacts the reference potential and the secondary winding and a damping resistor is inserted ahead of the measuring impedance. This device nevertheless can trip in response to a current surge.

It is known that a high level of magnetic saturation of a ferromagnetic material causes a remanance increase over stationary operation for a short time lasting between 10 to 30 ms. The protection circuit breaker trips because the inductive impedance of the secondary winding is lower during the increased remanence induction and the voltage signal at the measuring impedance is therefore increased. A known differential current protection circuit breaker suppresses surge currents caused by remote lighting strikes and by switching processes in supply networks.

SUMMARY OF THE INVENTION

The present invention provides a differential current protection circuit breaker that is more resistant to erroneous tripping in response to current surges.

According to the present invention, an evaluation circuit is blocked by a sensor that responds to current or voltage surges during the response time. The sensor controls a blocking means in the tripping device. The current or voltage surge is thus not turned off. Rather, a current or voltage surge is used to block the tripping of the protective circuit breaker. The circuit breaker is thus prevented from tripping in response to current surges.

The blocking is done by interrupting the signal between the secondary winding and the tripping device. In one embodiment, the evaluation circuit comprises a first stage having a rectifier and integration stage and a subsequent second stage having a threshold voltage switch. A coupling switch is interposed between the first and second stages and connected to the reference potential. The blocking device is controlled by the potential that the sensor measures between the squarewave generator and the complex impedance. An optical coupler functions as the coupling switch in the control circuit and acts as a sensor for detecting surges. The working output of an optical coupler discharges the capacitor of the integrating member of the first stage. The threshold switch in the second stage thus does not respond to the surge. The evaluation circuit is blocked by the response of the sensor until the optical coupler is again blocked between its working outputs. The optical coupling element has the advantage of completely separating the potential between the control and the working side so that large surge currents on the secondary side do not cause stray voltages. An optical coupling element is therefore suitable as a sensor for both very large and very steep current surges.

The coupling switch works with an optical coupling element that is controlled by the flow of current caused by the voltage difference between the reference potential and a point between the squarewave generator and the secondary winding. The potential can also be tapped between the secondary winding and a damping resistor for an optical coupling element.

The control potential can be tapped as the differential voltage at the secondary winding and fed to two poles of a coupling switch to produce a larger change in the signal produced by a current surge. This signal can then be o used to control the coupling switch. Small current surges thus cannot erroneously trip the differential current protection circuit breaker.

The coupling switch can control a circuit for the optical coupling element. Such a circuit may comprise a series connection of a fullwave rectifier, a voltage threshold detector, an R-C stage and associated storage capacitance, and a current limiting resistor. A current or voltage limiter can be arranged in the load circuit of the optical coupling element. The outputs from the control circuit is inserted between the rectifier and the integration member at the threshold switch of the evaluation circuit. The capacitor of the integration member is discharged via the current or voltage limiter once the optical coupling element responds. The threshold switch of the evaluation circuit cannot respond while the circuit is blocked.

DETAILED DESCRIPTION

Figure 1:
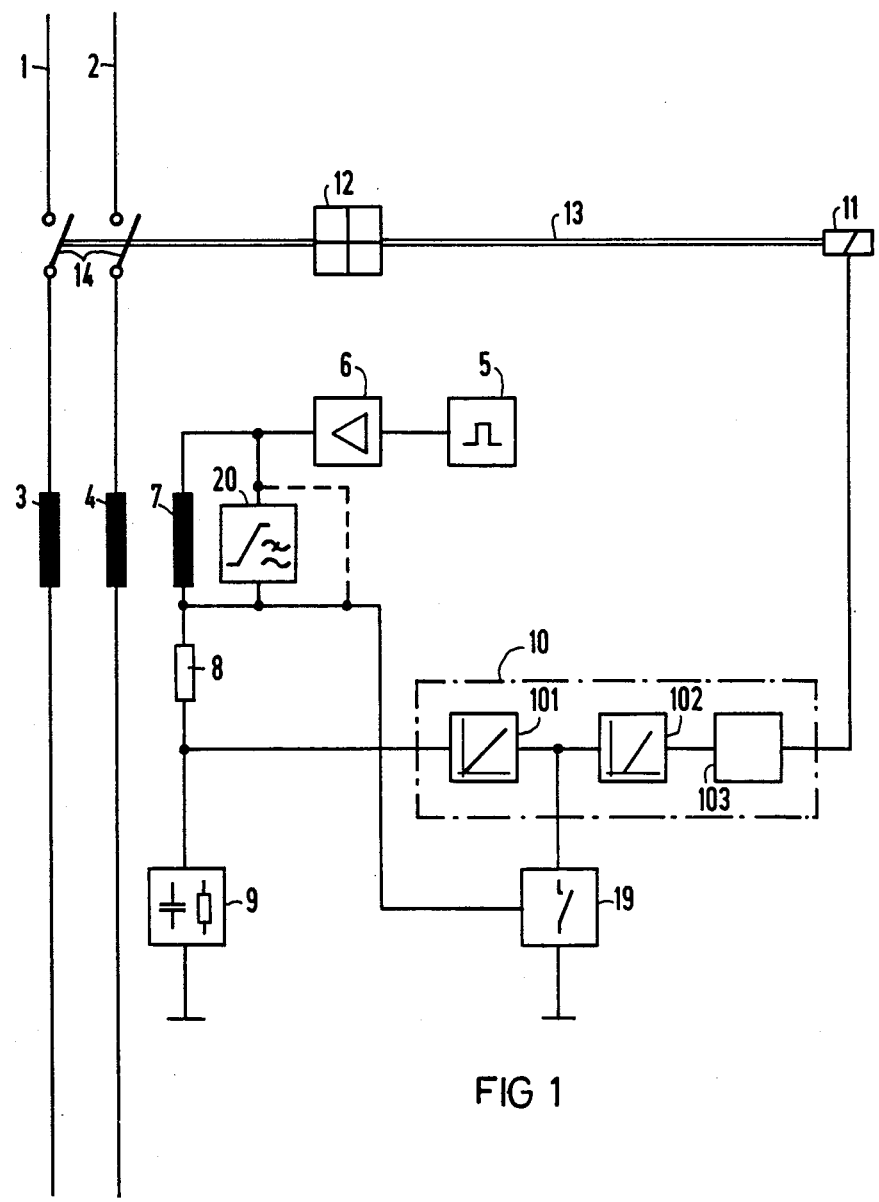
FIG. 1 shows two types of coupling for a different current protection circuit breaker of the present invention.

The protection circuit breaker shown in FIG. 1 monitors an outer conductor 1 and a central conductor 2, each of which form a primary winding 3 and 4 of the control circuit of a magnetic amplifier circuit or a summing current transformer. The primary windings 3 and 4 can be feeds of the outer conductor 1 and the central conductor 2 through a summing current transformer. A square wave generator 5 is connected via an amplifier 6 to the secondary winding 7 of the magnetic amplifier circuit or the summing current transformer. An ohmic damping resistor 8 and a complex, predominantly capacitive measuring impedance 9 are connected in series at the output of the secondary winding. The second terminal of the measuring impedance 9 is connected to a reference potential that is zero in this embodiment. The complex measuring impedance 9 is essentially a capacitor. The ohmic resistance is obtained as a side effect of the capacitor.

As shown in FIG. 1, an evaluation circuit 10 is connected to a tap between the secondary winding 7 and the s measuring impedance 9 behind the damping resistance 8 of the secondary winding 7. Evaluation circuit 10 comprises a series connection of a rectifier and integration member 101 followed by a second stage consisting of threshold switch 102 and an evaluation member 103. Coupling switch 19 may be inserted so that its power outputs are between the reference potential and between the recitifier and the integration member 101 and the threshold switch 102. If coupling switch 19 does not respond, the evaluation member 103 can make the tripping device 11 respond to a fault current so that the contact device 14 opens via a functional connection 13 and a switch latch 12 to protect its respective line.

As shown, coupling switch 19 acts as a sensor. A blocking device is connected on the control side between the secondary winding 7 and the damping resistor 8 as shown by solid lines in FIG. 1. The dashed lines show the coupling switch connected on the control side between the amplifier 6 and the secondary winding 7. A filter 20 is connected parallel to the secondary winding. FIG. 1 shows this connection as a lowpass filter connected with a parallel connected voltage limiter. The filter eliminates low frequency secondary signals protection circuit breaker can immediately trip.

High frequency current surges ordinarily lead to erroneous tripping. Evaluation circuit 10, however, is blocked in response to high frequency current surges. The embodiment illustrated by the dashed lines in FIG. 1 interrupts the connecting line shown in solid between the filter element 20 and the terminal.

The capacitor in the rectifier and integration member 101 discharges through its power outputs if current surges are fed to the coupling switch on the control side. The threshold switch 102 of the evaluation circuit 10 then cannot respond. The tripping device 11 therefore cannot be erroneously actuated.

Figure 2:
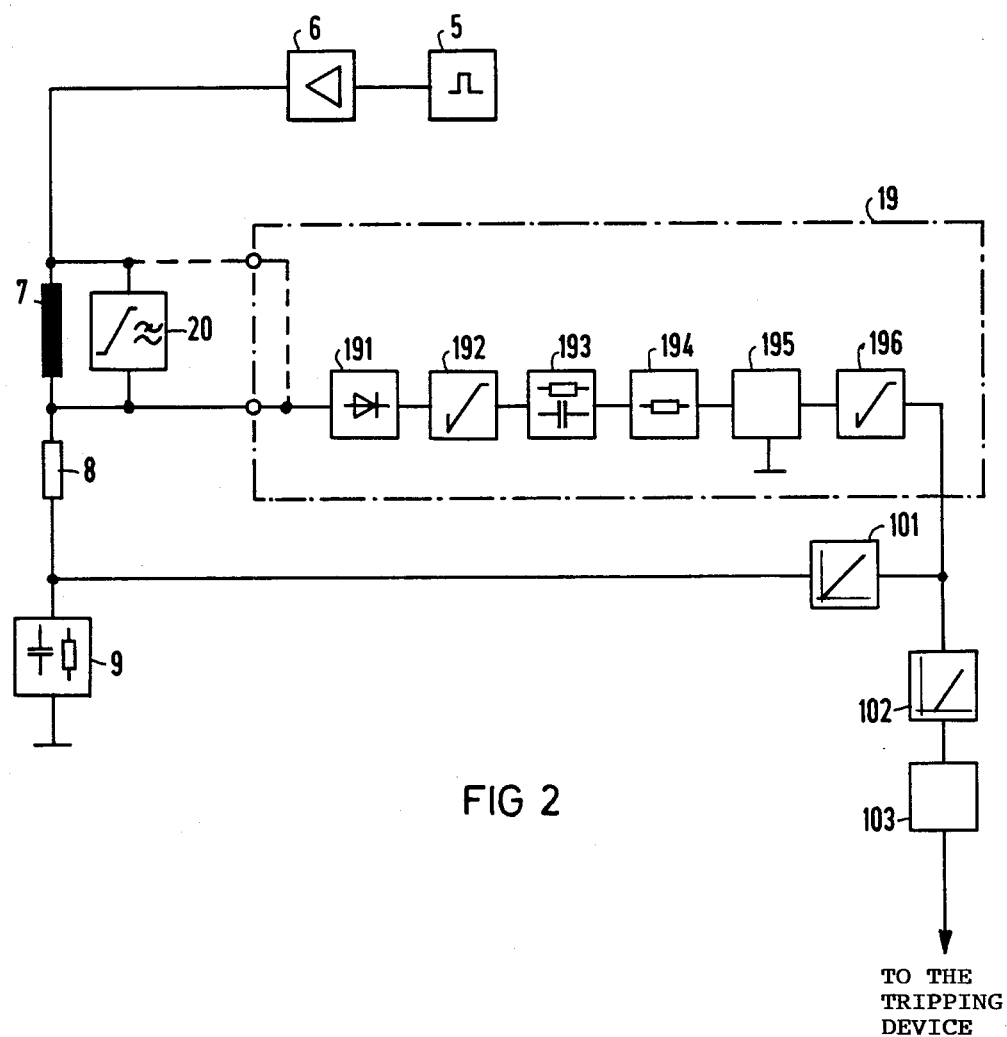
FIG. 2 shows an embodiment for a coupling switch for the secondary circuit of the summing current transformer in conjunction with the evaluation circuit of the differential protection circuit breaker.

FIG. 2 shows a secondary circuit that has a differential current protection circuit breaker. The coupling switch 19 is constructed by connecting a full Wave rectifier 191 in series With a voltage threshold 192 such as a Zener diode. The voltage threshold prevents a response in the event of difference currents in the control range. Also connected in series is an R-C member having a surge capacitor 193 and a current limiter 194. The current limiter may comprise an ohmic resistor. Also in series in the discharge circuit of the capacitor of the rectifier and the integration member 101 are an optical coupling element 195 and a current or voltage limiter 196.

A full wave rectifier 191 causes positive or negative voltage peaks that are generated on the secondary side by current surges to be processed in the same manner. The full wave rectifier thus causes a similar blocking of the evaluation circuit 10.

The time of current flow through the optical coupling element 195, for example a light emitting diode, can be set to a time of preferably less than or equal to 1 ms using a suitable storage capacitor 193 and current limiter 194. The capacitor in the rectifier and integration member 101 is discharged and kept discharged during this time period. Limiting the discharge time to a few ms assures that the evaluation circuit 10 does not remain blocked longer than absolutely necessary. In addition, the blocking time for the threshold switch 102 can be reduced by inserting current or voltage limiter 196 into the discharge circuit of the capacitor of the rectifier and the integration member. The capacitor thus remains at a voltage determined by the limiter plus the forward voltage of the optical coupling element comprising, for example, a photo-transistor. The capacitor is then not discharged further.

Figure 3:
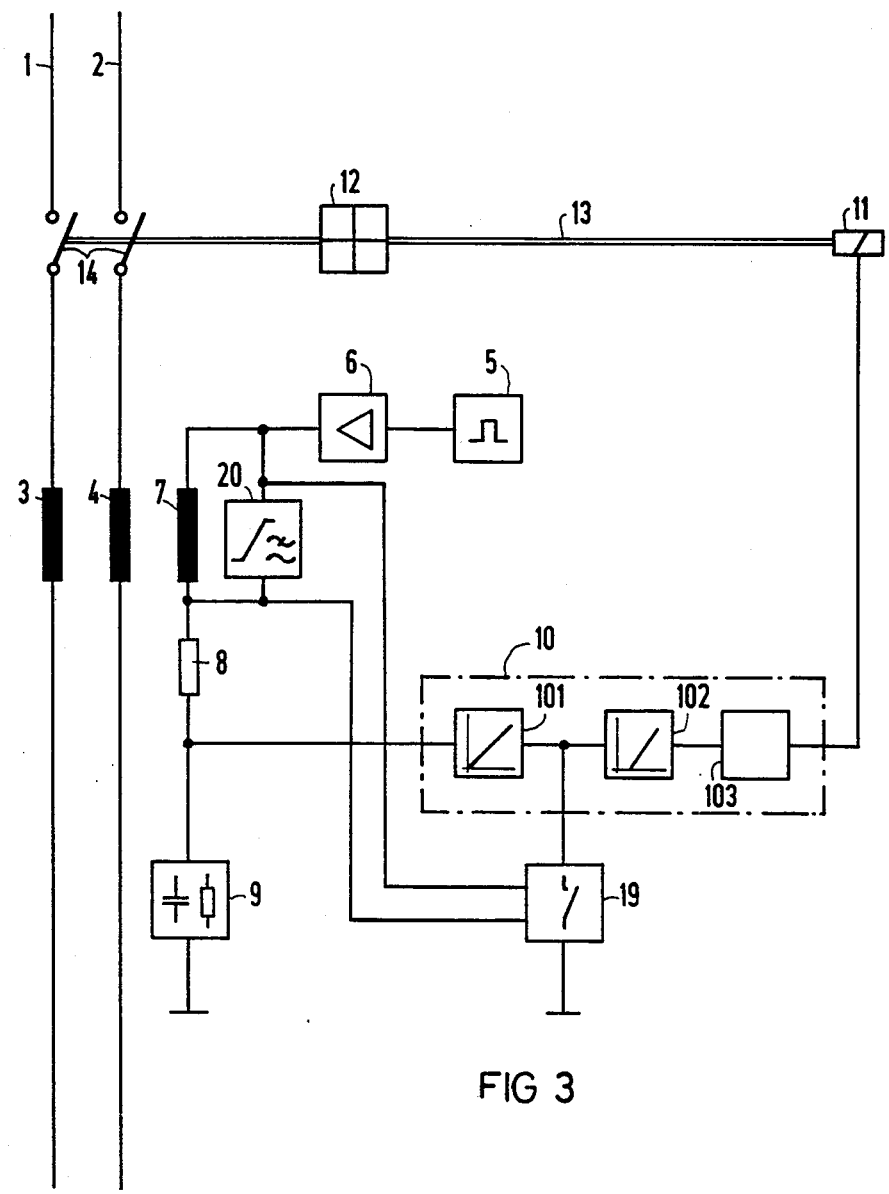
FIG. 3 shows a differential current protection circuit breaker as shown in FIG. 1 wherein the coupling switch has a difference signal fed by the secondary winding.

The coupling switch 19 is protected from destruction by extreme current surges and high voltages if a voltage limiter is connected parallel to the filter element 20. The remaining electronic components are similarly protected. Both of the control lines of the coupling switch 19 shown in FIG. 3 are connected with both control lines to the secondary winding 7 so as to be connected across the terminals. FIG. 1, in contrast, shows the second control line connected to the reference potential.

What is claimed is:

1. A differential current protection circuit breaker, comprising:
   a magnetic amplifying circuit having a secondary winding;
   means for producing a complex, predominantly capacitive measuring impedance connected to said secondary winding;
   a square wave generator connected in series to said impedance producing means through said secondary winding;
   a tap between said impedance means and said square-wave generator;
   an evaluation circuit connected to said tap for generating a control signal;
   a switch for disconnecting said magnetic amplifying circuit;

means for tripping said switch in response to said control signal from said evaluation circuit; and means for blocking said evaluation circuit from generating said control signal during current or voltages surges.

2. A differential current protection circuit breaker comprising:

a magnetic amplifying circuit having a secondary winding;

means for producing a complex, predominantly capacitive measuring impedance connected to said secondary winding;

a square wave generator connected in series to said impedance producing means through said secondary winding;

a tap between said impedance means and said square-wave generator;

an evaluation circuit connected to said tap for generating a control signal;

a switch for disconnecting said magnetic amplifying circuit;

means for tripping said switch in response to said control signal from said evaluation circuit; and means for blocking said evaluation circuit from generating said control signal during current or voltages surges, said evaluation circuit having a first stage having a rectifier and an integrating member and a second stage having a threshold switch connected to said first stage; and said blocking means further comprising a coupling switch connected to a reference potential between said tap and between said square wave generator and said impedance producing means.

3. A differential current protection circuit breaker as claimed in claim 2, wherein said coupling switch comprises an optical coupling element, and further comprising a connection between said secondary winding and said square wave generator, said optical element being controlled by a current flow caused by a voltage difference between said connection and ground.

4. A differential current protection circuit breaker as claimed in claim 3, wherein said optical coupling element is controlled by current flow caused by a voltage difference between said secondary winding and a damping resistor ahead of said impedance producing means said voltage difference being measured with respect to a reference potential.

5. A differential current protection circuit breaker as claimed in claim 4, wherein said coupling switch comprises a series connection of said optical coupling element, a full-wave rectifier, a voltage threshold detector, an R-C storage capacitor and current-limiting resistor, and a current or voltage limiter.

6. A differential current protection circuit breaker as claimed in claim 2, wherein said coupling switch has two control lines and said secondary winding is connected between said control lines.

* * * * *